(12) United States Patent
Wadkins

(10) Patent No.: US 10,906,197 B2
(45) Date of Patent: Feb. 2, 2021

(54) SYNTHETIC TURF SEAM INTEGRATION TEMPLATE SYSTEM AND METHODS OF USE

(71) Applicant: Joe Dennis Wadkins, Las Vegas, NV (US)

(72) Inventor: Joe Dennis Wadkins, Las Vegas, NV (US)

(*) Notice: Subject to any disclaimer, the term of this patent is extended or adjusted under 35 U.S.C. 154(b) by 0 days.

(21) Appl. No.: 16/659,377

(22) Filed: Oct. 21, 2019

(65) Prior Publication Data

US 2020/0047363 A1    Feb. 13, 2020

Related U.S. Application Data

(63) Continuation-in-part of application No. 16/285,076, filed on Feb. 25, 2019, now Pat. No. 10,449,684, which is a continuation of application No. 15/830,542, filed on Dec. 4, 2017, now Pat. No. 10,213,933, which is a continuation-in-part of application No. 14/839,816, filed on Aug. 28, 2015, now Pat. No. 9,833,920.

(51) Int. Cl.

| | |
|---|---|
| *B26B 29/06* | (2006.01) |
| *B29C 65/00* | (2006.01) |
| *B29C 65/50* | (2006.01) |
| *B29C 65/74* | (2006.01) |
| *B29C 65/48* | (2006.01) |
| *B29L 31/00* | (2006.01) |

(52) U.S. Cl.
CPC .............. *B26B 29/06* (2013.01); *B29C 65/48* (2013.01); *B29C 65/5042* (2013.01); *B29C 65/74* (2013.01); *B29C 66/02241* (2013.01); *B29C 66/1142* (2013.01); *B29C 66/221* (2013.01); *B29C 66/229* (2013.01); *B29C 66/305* (2013.01); *B29C 66/43* (2013.01); *B29L 2031/722* (2013.01); *B29L 2031/732* (2013.01)

(58) Field of Classification Search
CPC ... G01B 5/20; G01B 3/04; G01B 3/14; G01B 5/14; G01B 3/00; G01B 1/00; G01B 3/002; G01B 3/02; G01B 3/34; G01B 3/563; G01B 5/0004; B26B 29/06; B29C 66/43; B29C 66/305; B29C 66/229; B29C 66/221; B29C 66/02241
USPC .......................................................... 33/562
See application file for complete search history.

(56) References Cited

U.S. PATENT DOCUMENTS

| | | |
|---|---|---|
| 3,509,633 A | 5/1970 | Fernandes |
| 3,678,586 A | 7/1972 | Weber |
| 3,805,390 A | 4/1974 | Craig |
| 4,330,939 A | 5/1982 | Robinson |

(Continued)

*Primary Examiner* — Yaritza Guadalupe-McCall
(74) *Attorney, Agent, or Firm* — Connie R. Masters

(57) ABSTRACT

A synthetic turf seam integration template system and method is provided that includes a template having a planar base including a longitudinal non-cutting edge and an opposing longitudinal cutting edge. The longitudinal cutting edge is not straight but has a predetermined curvature. In one aspect, a through-cut viewing slot extends longitudinally offset a predetermined distance from said non-cutting edge. Variations of the predetermined curvature patterns are disclosed. An optional connector allows connection of two templates to create a longer template for usage on longer seams. Also disclosed are methods of using the seam integration tool in creating an undetectable seam in synthetic turf.

20 Claims, 12 Drawing Sheets

(56) References Cited

U.S. PATENT DOCUMENTS

| | | | |
|---|---|---|---|
| 4,502,232 | A | 3/1985 | Broders |
| D358,780 | S | 5/1995 | Lyons |
| 5,682,935 | A | 11/1997 | Bustamante |
| 5,813,127 | A | 9/1998 | Blevins |
| 5,842,402 | A | 12/1998 | Collier |
| 5,922,157 | A | 7/1999 | Snider |
| 5,960,554 | A | 10/1999 | Kamykowski |
| 5,966,824 | A | 10/1999 | Vazquez |
| 6,112,425 | A | 9/2000 | Nelson et al. |
| 6,578,279 | B1 | 6/2003 | Moon |
| 7,028,412 | B2 | 4/2006 | Boomershine |
| 7,155,796 | B2 | 1/2007 | Cook |
| 8,123,880 | B2 | 2/2012 | Plunket et al. |
| 8,404,068 | B2 | 3/2013 | Plunket et al. |
| 10,213,933 | B2 * | 2/2019 | Wadkins ................. B26B 29/06 |
| 10,449,684 | B2 * | 10/2019 | Wadkins ............. B29C 66/1142 |
| 2005/0129906 | A1 | 6/2005 | Knox |
| 2019/0184589 | A1 * | 6/2019 | Wadkins ............... B29C 66/305 |
| 2020/0047363 | A1 * | 2/2020 | Wadkins ............. B29C 66/1142 |

* cited by examiner

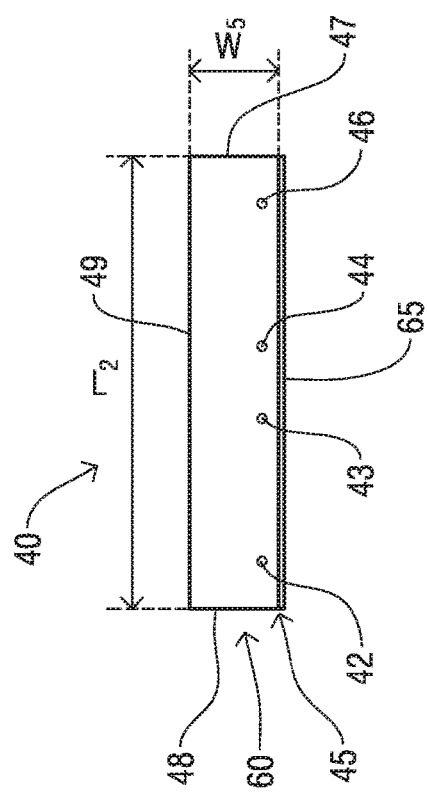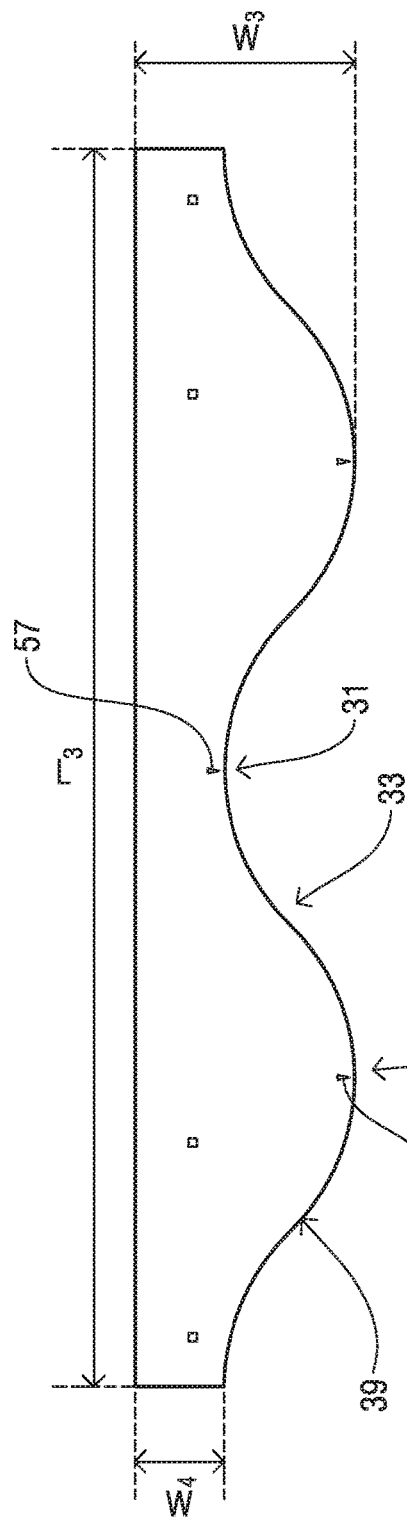

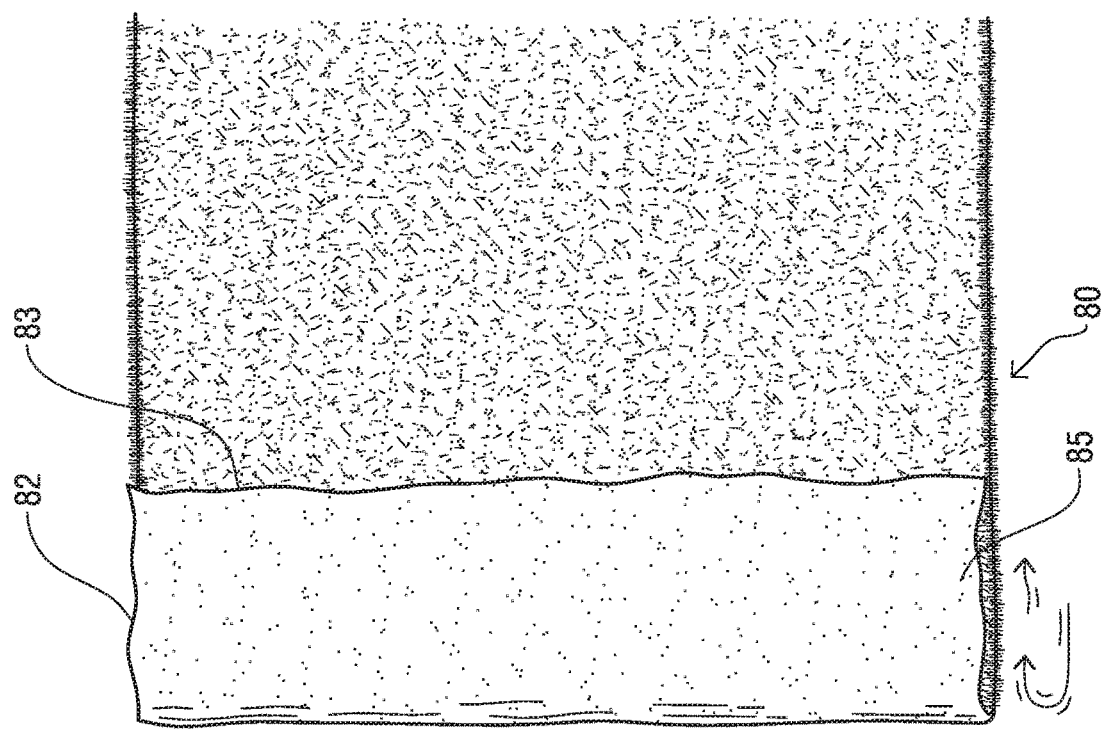
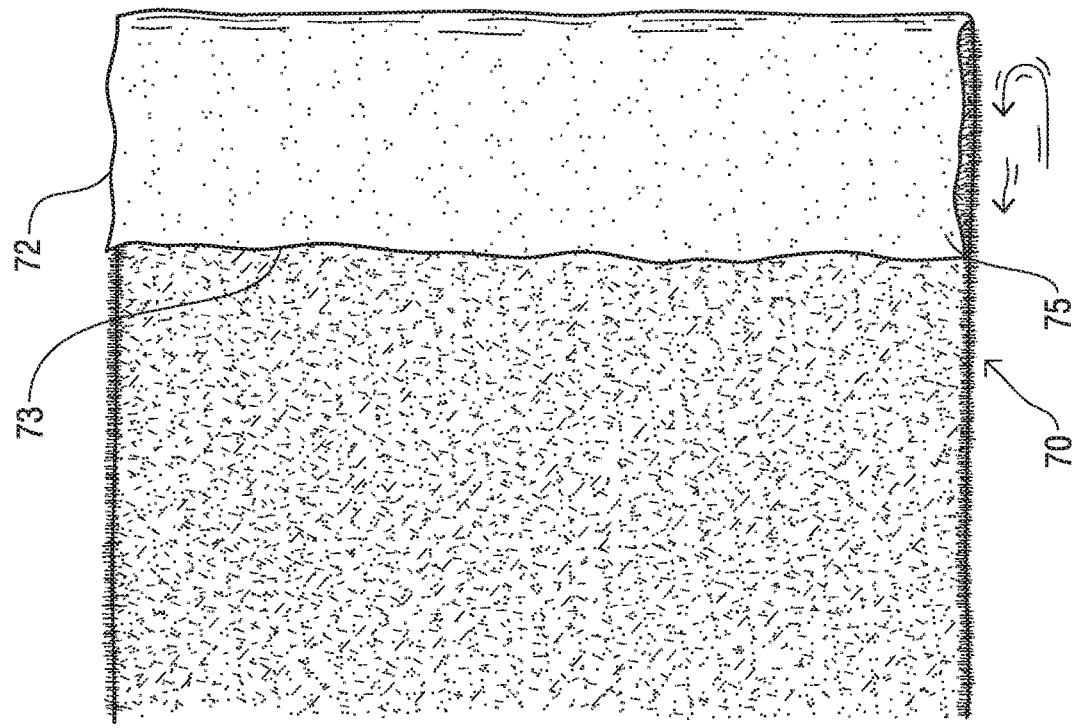
Fig. 8

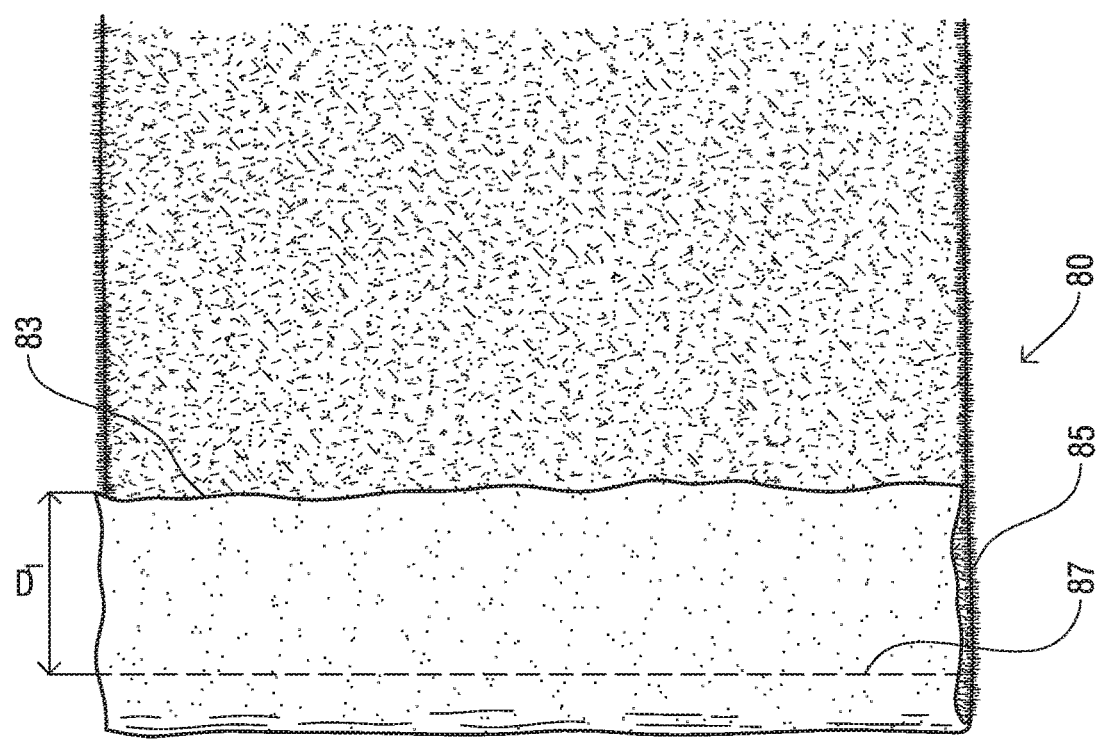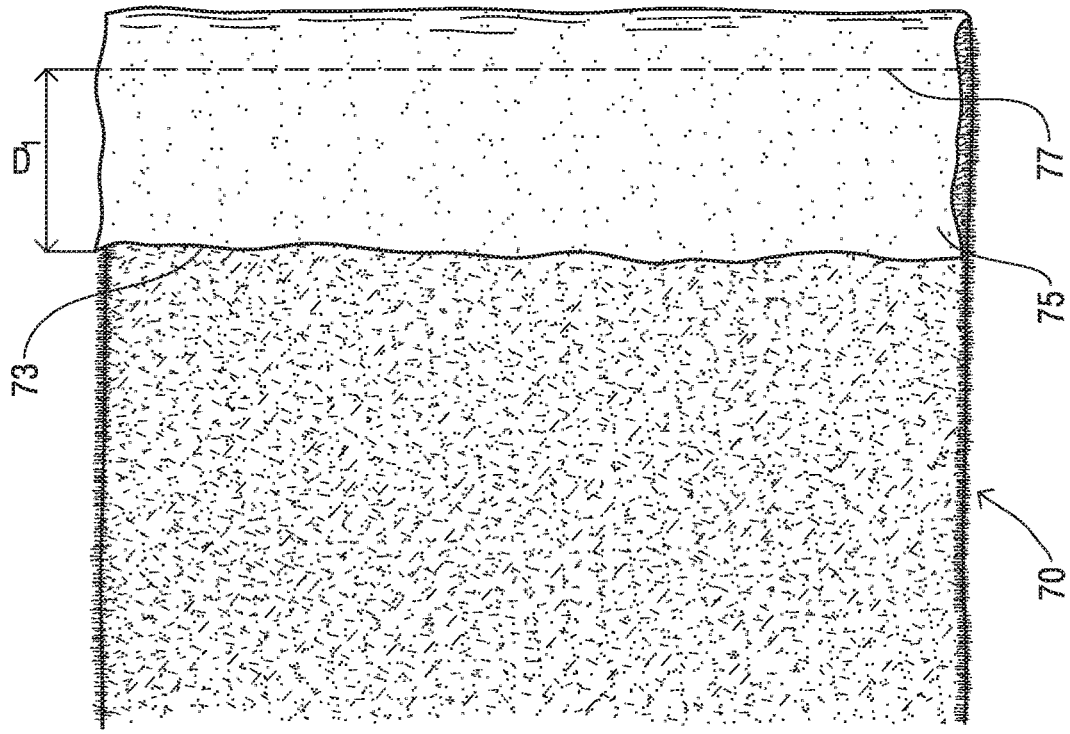
Fig. 9

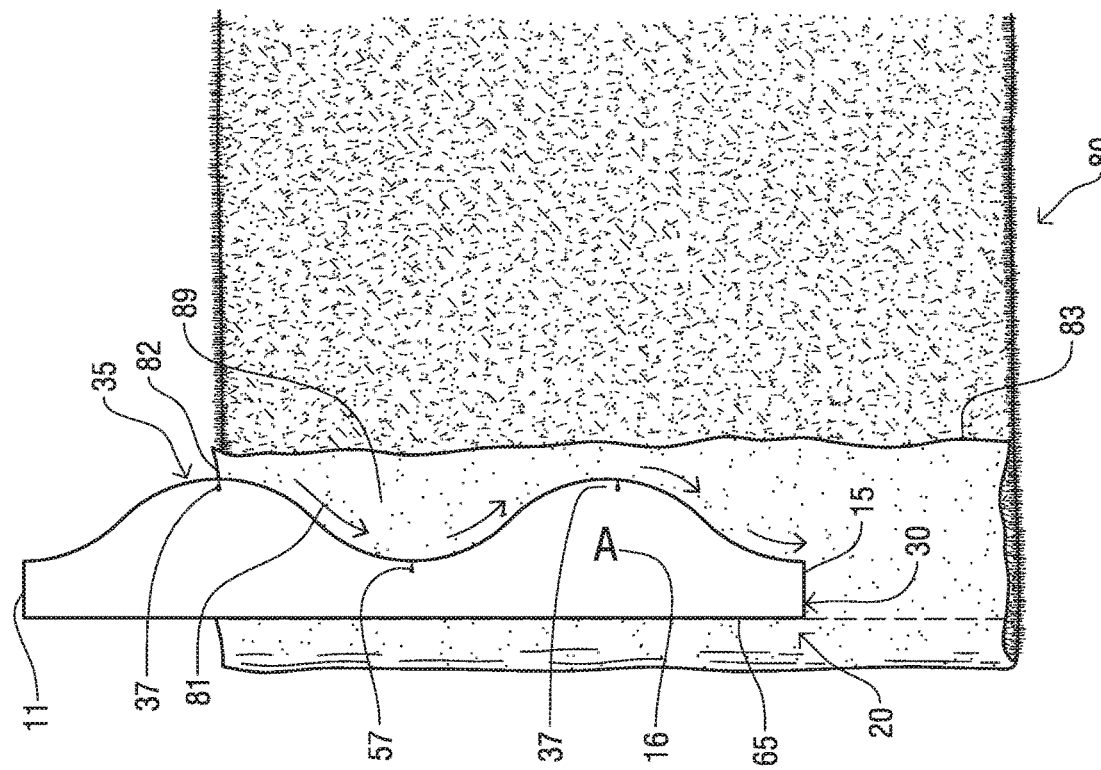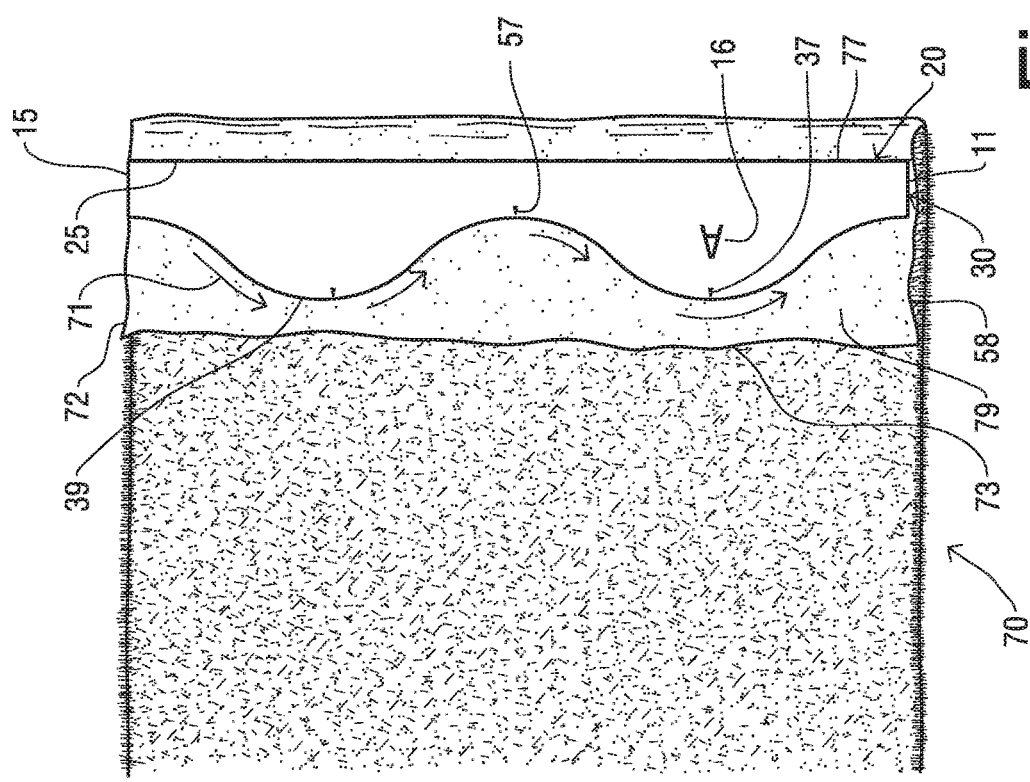
Fig. 10

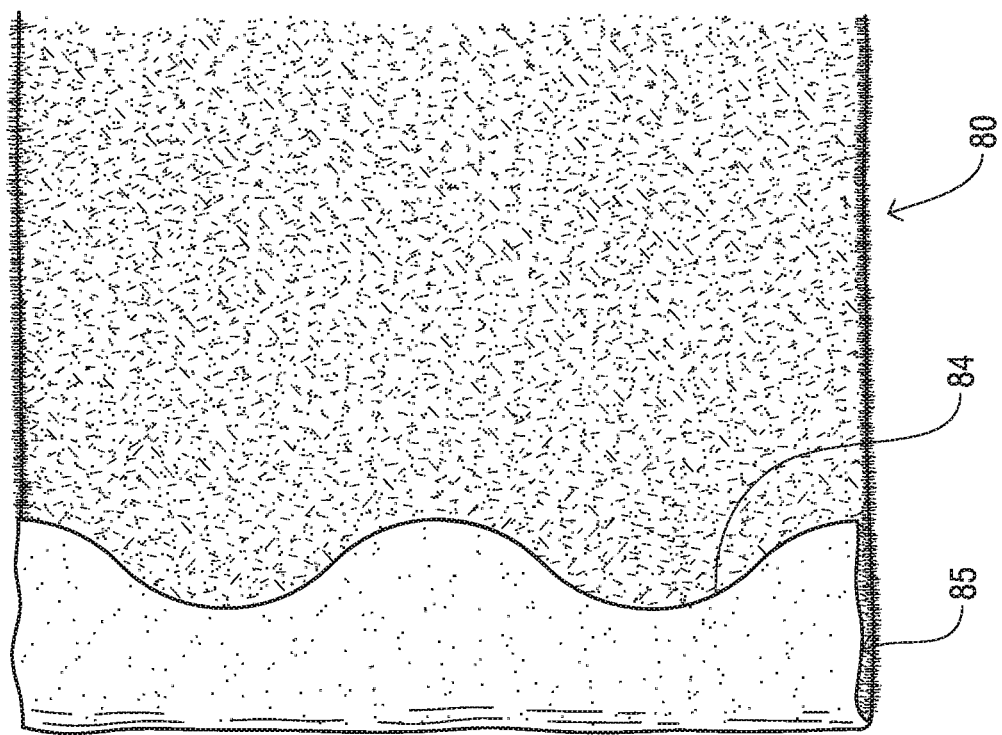
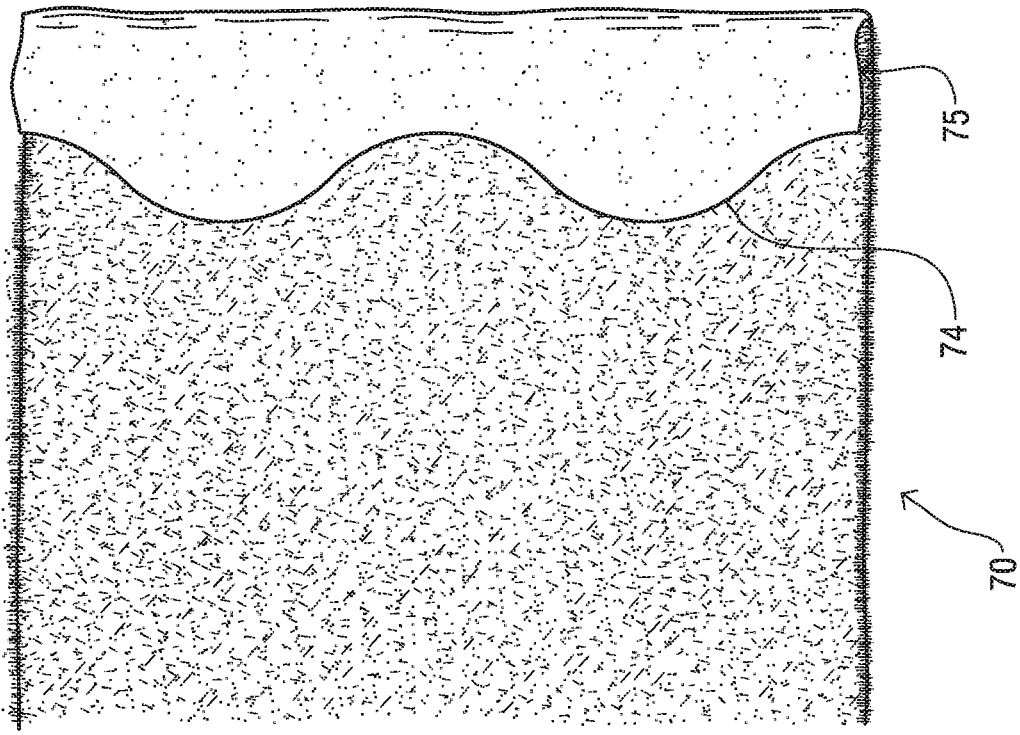
Fig. 11

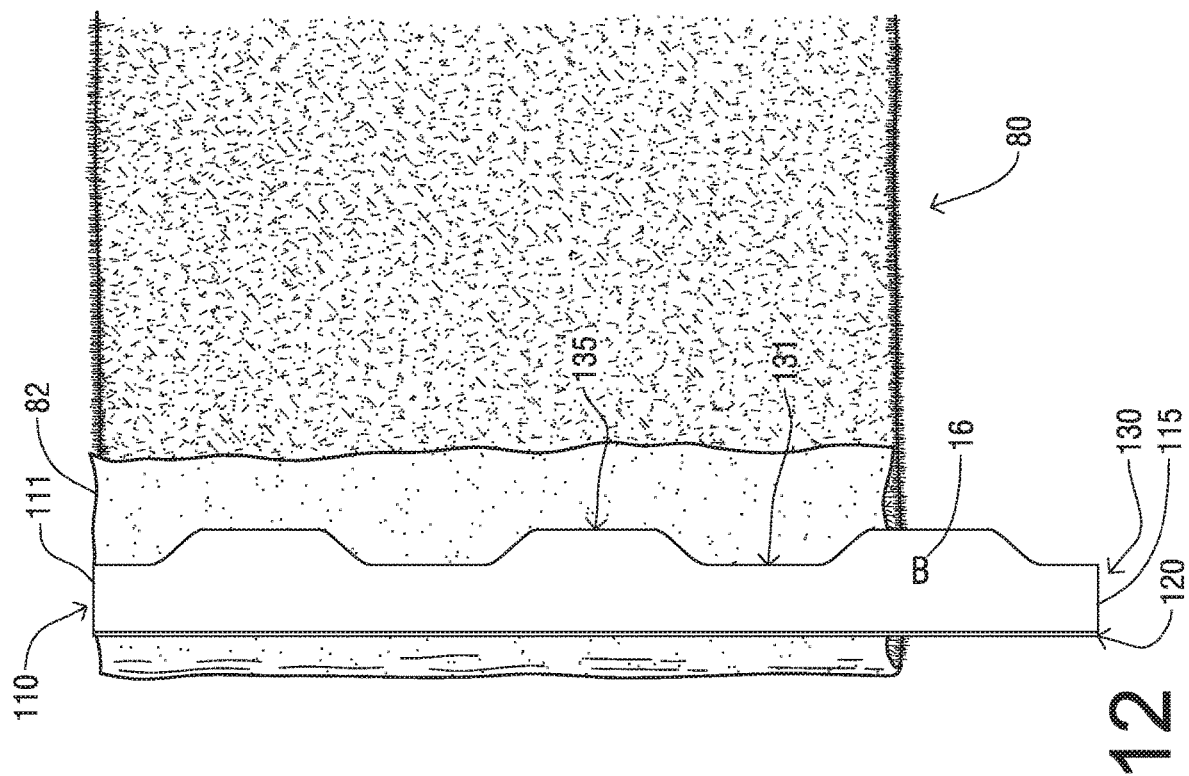
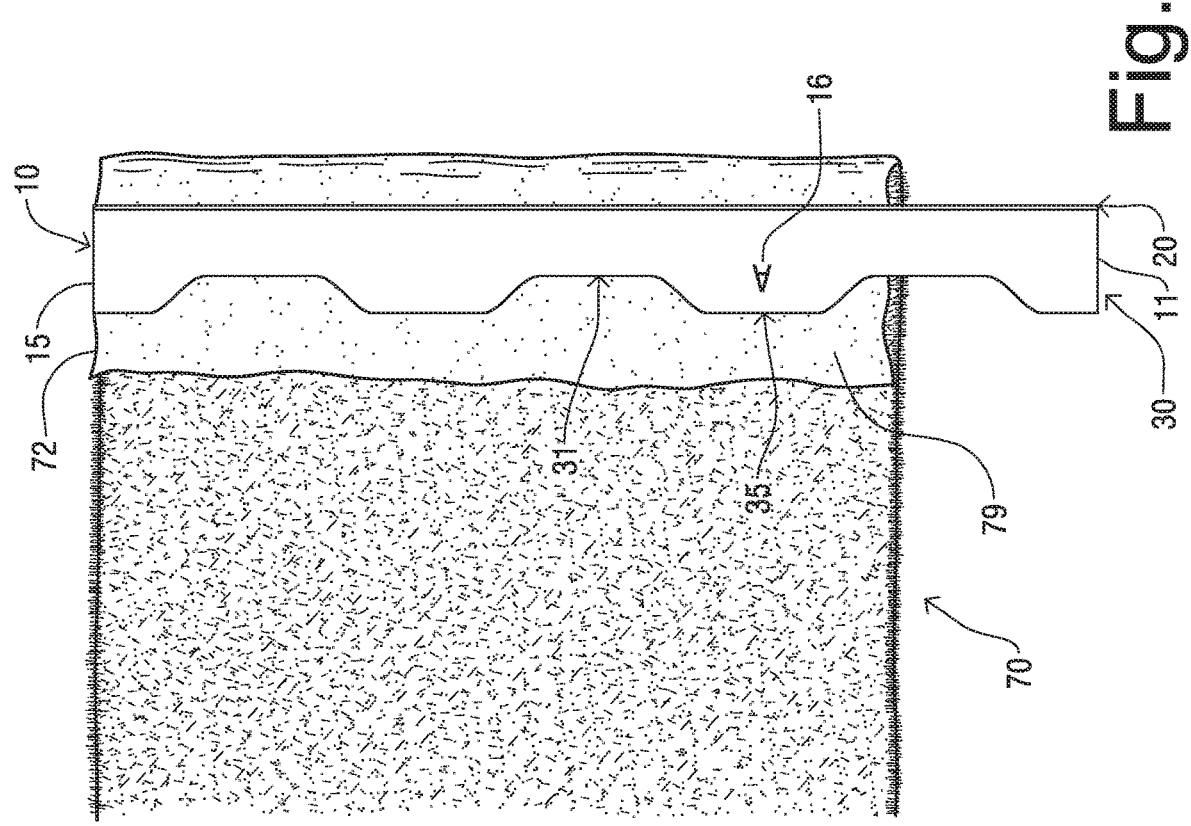
Fig. 12

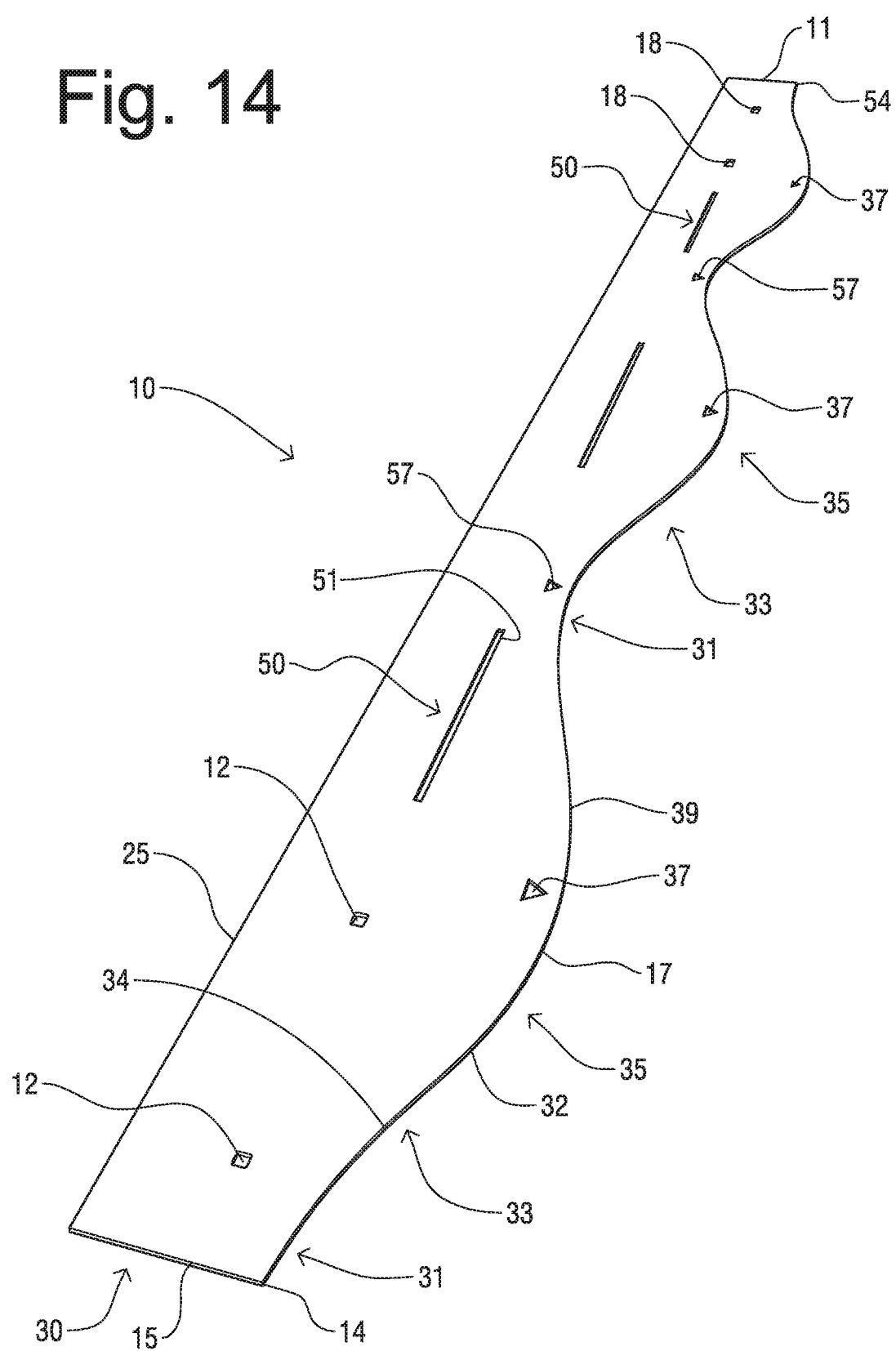

SYNTHETIC TURF SEAM INTEGRATION TEMPLATE SYSTEM AND METHODS OF USE

CROSS-REFERENCE TO RELATED APPLICATIONS

The present nonprovisional application is a continuation-in-part application of currently pending U.S. patent application Ser. No. 16/285,076 filed on Feb. 25, 2019, issuing as U.S. Pat. No. 10,449,684 on Oct. 22, 2019; which is a continuation application of U.S. patent application Ser. No. 15/830,542 filed on Dec. 4, 2017, that issued as U.S. Pat. No. 10,213,933 on Feb. 26, 2019; which is a continuation-in-part application of U.S. patent application Ser. No. 14/839,816 filed on Aug. 28, 2015, that issued as U.S. Pat. No. 9,833,920 on Dec. 5, 2017; all of which are incorporated by reference herein in their entirety.

FIELD OF INVENTION

This invention relates generally to hand tools for manual use and, more particularly, to a template and template system for cutting synthetic turf and to methods of using the template system to create an inconspicuous turf seam.

BACKGROUND OF THE INVENTION

Replacing grass with artificial or synthetic turf provides several advantages, such as greatly reducing the need for lawn maintenance and eliminating the use of water for lawn irrigation. Synthetic turf is fabricated with an upward-facing synthetic grass face formed by tufts of grass (and, optionally, additional thatch tufts) and a downward-facing backing or understructure that supports the synthetic tufts of the grass face. It is usually provided by the manufacturer in roll form in sizes suitable for shipping and for retail store display. The turf roll is fabricated with a manufacturer's lateral width (typically a width of 10 to 15 feet between the turf lateral sides) and with a longer longitudinal length (such as a length of 100 to 300 feet). In retail stores, at the time of purchase, the required length of synthetic turf needed to meet the requirement of the particular turf installation area is dispensed from the roll of turf and then cut. If the area to be covered with turf has a width less than the manufacturer's width, a single width of turf is laid on the ground in the turf installation area. Then the sides are trimmed to fit the adjacent hard structures ("hardscapes"), which may be in the form of a sidewalk, lawn edging, roadway, planter border, etc.

However, often when installing synthetic turf there is a need to use multiple pieces of turf, because the manufacturer's turf lateral width is too narrow to cover the width of the turf installation area. In one conventional example, if two turf pieces are necessary to meet the width requirement, they may be laid with the inner, adjacent lateral straight edges of both turf pieces adjacent one another to begin to form a seam. To create the seam, the inner edges of each piece of turf are turned back a few inches, such as 15 to 30 inches. This results in the turf understructure being turned upward with the grass face of the turned back area laid back on the adjacent flat grass face area. The edges of the overlapped piece are trimmed to remove any scrim, generally following fiber or stitching lines on the backing or understructure of the turf and attempting to maintain the gauge of the fibers. The gauge (typically ⅜ inch, ½ inch, ¾ inch, or 5/16 inch) of synthetic turf is the distance between rows of stitching where the stitching attaches the turf to the turf understructure. For instance, if the synthetic turf is manufactured with a ¾-inch gauge, an attempt is made to maintain the ¾ inch spacing at the edges that will form the seam.

After trimming, the newly cut inner straight edges of synthetic turf are abutted by pulling and sliding the two turf pieces until the cut edges are together. The edges are turned back again to allow seam cloth or tape to be placed on the ground under the two cut edges. Adhesive is applied to the seam tape. The newly cut abutting inner edges of both turf pieces are flipped back flat with the turf understructure downward for adhering to the adhesive and with the inner edges of the two turf pieces touching each other. This creates a typical straight seam between the inner lateral edges of the synthetic turf. Then the outer lateral edges of both turf pieces are trimmed to fit the outlining hard structures.

However, this conventional example method of seam formation often creates a problem. At times this straight seam does not lay flat, but may, conversely, create a ridge or "Mohawk" effect, which cannot be pressed down or obliterated. This is particularly likely to happen with the newer synthetic turf that has a thicker, more realistic artificial grass face and incorporates an artificial thatch layer between the straight grass fibers, such as turf having a 50-ounce face weight or greater. A ridged seam will not improve over time, but will continue to have an upward thrust at the abutting edges, which will not be satisfactory to the homeowner or business owner who is having the synthetic turf installed.

Accordingly, there is a need for a device that will smoothly integrate the inner edges of two sections of synthetic turf to form an imperceptible seam and prevent the formation of a ridged seam.

BRIEF SUMMARY OF THE INVENTION

The present invention is directed to a synthetic turf seam integration template system and methods of use. The seam tool system comprises at least one template including a planar base. The template base extends longitudinally from a first lateral base end to a second lateral base end and extends laterally from a longitudinal cutting edge to an opposing straight longitudinal non-cutting edge. The longitudinal cutting edge is not straight but is shaped with a predetermined "irregular" pattern, such as a curved pattern, trapezoidal pattern, or other non-straight pattern, to promote the inconspicuousness of seams created by following the patterns of the cutting edge. Several variations or styles of patterns, each having multiple narrow portions interspersed with multiple wide portions, are disclosed.

In use, preferably the planar base is positioned horizontally upon the turned back portion of the synthetic turf to be cut. The turf is cut from the back side by following the pattern of the cutting edge. Optionally, the turf can be cut from the front, though most turf manufactures recommend cutting from the back.

In one aspect of the invention, the template includes a flange-like positioner attached along the longitudinal non-cutting edge at a generally perpendicular angle. The positioner creates a short, upright handle used for manual positioning and moving the template during use.

In another aspect of the invention, the template includes a view slot to allow the user to view the visible lines on the bottom of the turf backing or understructure. This facilitates alignment of the template with the orientation of the turf.

In a further aspect, which may be used with any of the embodiments of the invention, the seam tool system further comprises an optional connector that can be used to connect a first one of the templates to an identical second one of the templates. This template-connector-template system proves advantageous for larger installations of synthetic turf where the seams can be quite lengthy and where using two templates joined together saves time.

The connector includes at least a connector horizontal member with a first and an opposing second longitudinal side and with a first half and an opposing second half. The first half is configured with a connector-to-template fastening mechanism, such as, for example, at least two holes spaced a first preset distance apart for receiving bolts, a latch, a snap fit mechanism, or other conventional fastening mechanism. Similarly, the second half is also configured with a similar connector-to-template fastening mechanism, such as, for example, at least two holes spaced a second preset distance apart for receiving bolts, a latch, a snap fit mechanism, or other conventional fastening mechanism. If the connector is to be used, the template planar base is configured with a base template-to-connector fastening mechanism that is complementary to the connector-to-template fastening mechanism, such as connector-attaching holes corresponding in spacing to the preset spacing of the connector holes, a complementary latch device, a complementary snap fit mechanism, or other conventional complementary fastening mechanisms.

In another aspect, the connector may have a flange perpendicularly attached to or above one of the first or second longitudinal sides that may aid in alignment.

In one embodiment of the invention, a single or primary template is used. The ends of the primary template ends are configured to continue the curvature pattern. For example, both ends may be narrow, as shown, so that the pattern is continued when the template is moved along the turf edge to be cut. In the method of use of the seam tool of this embodiment, one single template is used to cut the inner edge of the first piece of turf, and then turned 180 degrees and used to cut the inner edge of the second piece of turf. To cut the first side, the single template is placed with a lateral end on the outer edge of the first piece of turf, but to cut the second side, this single seam tool is offset half of the curvature pattern to allow the cut curved portions to correspond. For example, if the predetermined curve shape is a wave shape, the edge of the single template with a narrow template portion may be placed at the outer edge of the first piece of turf, but when turned 180 degrees and used to cut the second piece of turf, the single template is offset to place the wide template portion at the outer edge of the second piece of turf. Thus, when folded back, the wider sections will align with the narrower sections of turf and vice versa. When two duplicate templates are joined by a connector, the template-connector-template system is used in the same manner; when it is turned 180 degrees to cut the second turf piece, it is offset.

In another embodiment of the invention, a second type of template is additionally provided—a coordinating template, as shown in FIG. 7. The inclusion of a coordinating template removes the need to offset the primary template on the second piece of turf, because it's pattern is offset from the primary template's pattern. This coordinating template has a curvature that complements or synchronizes with the curvature of the primary template. The primary template and coordinating template form a coordinating template set. The primary template of the coordinating template set has a template first end with a first width (narrow or wide); the second coordinating template has a template first end having a width that is the complement to the width of the first template end (wide or narrow). For example, if the first end of the primary template forms the middle of a narrow portion of a curvature pattern, the first end of the second coordinating template will provide the middle of a wide portion of the same curvature pattern. In this embodiment, though two templates are required, no offset is needed during cutting of the second side of the turf. This embodiment reduces the possibility of user error because there is no need to remember to offset the template to begin cutting the second piece of turf.

An object of the present invention is to provide a system that can be efficiently used to smoothly integrate the inner lateral edges of two sections of synthetic turf to form an imperceptible seam.

This and other objects, features, and advantages of the present invention will become more readily apparent from the attached drawings and from the detailed description of the preferred embodiments which follow.

BRIEF DESCRIPTION OF THE SEVERAL VIEWS OF THE DRAWINGS

The preferred embodiments of the invention will hereinafter be described in conjunction with the appended drawings, provided to illustrate and not to limit the invention, where like designations denote like elements.

FIG. 4 is a top view of the optional connector of FIG. 3.

FIG. 5 is a top view of a primary template showing a shorter template and showing another variation of the predetermined curvature pattern of the cutting edge of a template of the present invention.

FIG. 8 is a diagram showing two pieces of synthetic turf (shortened longitudinally for illustration purposes) with the inner edges of both pieces of turf flipped backward to form a right and left overlap and with the turf understructure of both overlaps facing upward, as described in the method of use of the present invention.

FIG. 9 shows the creation or distinguishing of a laterally-extending line on each of the two overlapped turf pieces, which is one of the steps in the method of use of the present invention.

FIG. 10 shows additional steps in the method of use of the present invention.

FIG. 11 shows the newly cut lateral edges of both the right and left turf pieces.

FIG. 12 shows a variation of the method steps illustrated in FIG. 10, utilizing the coordinating template system using two non-duplicate templates.

FIG. 14 is a perspective view of the template of FIG. 13.

Like reference numerals refer to like parts throughout the several views of the drawings.

DETAILED DESCRIPTION OF THE INVENTION

Shown throughout the figures, the present invention is directed toward a synthetic turf seam integration template, template system, and methods of utilizing a single template, two duplicate templates, a coordinating template set, and/or other parts of the template system.

Multiple embodiments are provided. A first embodiment (shown in FIGS. 1-2, 5, 6, 10) discloses a single template 10 with a primary curvature pattern. This single template 10 can be used alone, can be used in combination with an optional connector 40 (FIGS. 3-4) with a duplicate template 10 having the primary curvature pattern, or can be used with a coordinating template 110 of the second embodiment that has a complementary curvature pattern.

Figure 7:
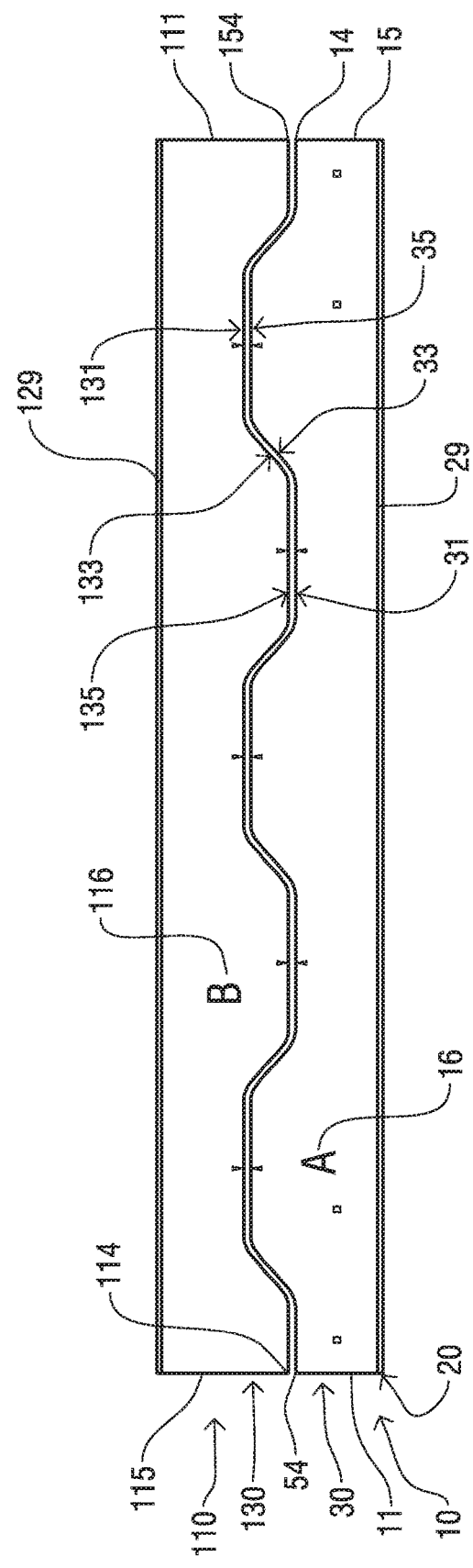
FIG. 7 is a perspective view of a primary template with a second template (the coordinating template), which together form a coordinating template system of a second embodiment of the present invention.

As shown in FIGS. 7 and 12, a second embodiment includes both the primary template 10 with the primary curvature pattern and a coordinating template 110, which has a curvature pattern that is the complement of the primary curvature pattern. Variations in the curvature pattern are also disclosed.

In FIGS. 8-12 methods of using the template and template system of the invention are provided. The methods include utilizing (with or without the optional connector 40) the single template 10 or the single template 10 with a coordinating template 110 to cut the adjacent, inner edges of two pieces of synthetic turf in a predetermined curvature pattern, thereby enabling the creation of an undetectable or inconspicuous seam between the two turf pieces.

Figure 13:
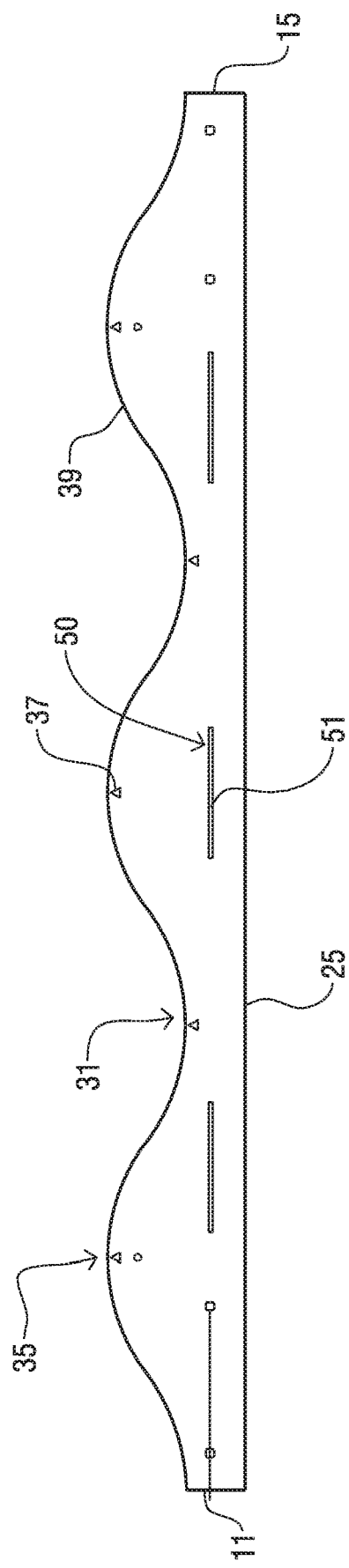
FIG. 13 is a top view of a template of a third embodiment of the invention, in which the template does not include a perpendicular positioner and in which the template includes a view slit of one aspect of the invention.

FIGS. 13-14 illustrate a third embodiment in which the template lacks the perpendicularly-extending positioner 20 of the first embodiment. They also illustrate a further aspect of the invention in which the template includes a viewing slit to assist in alignment of the template 10.

Figure 1:
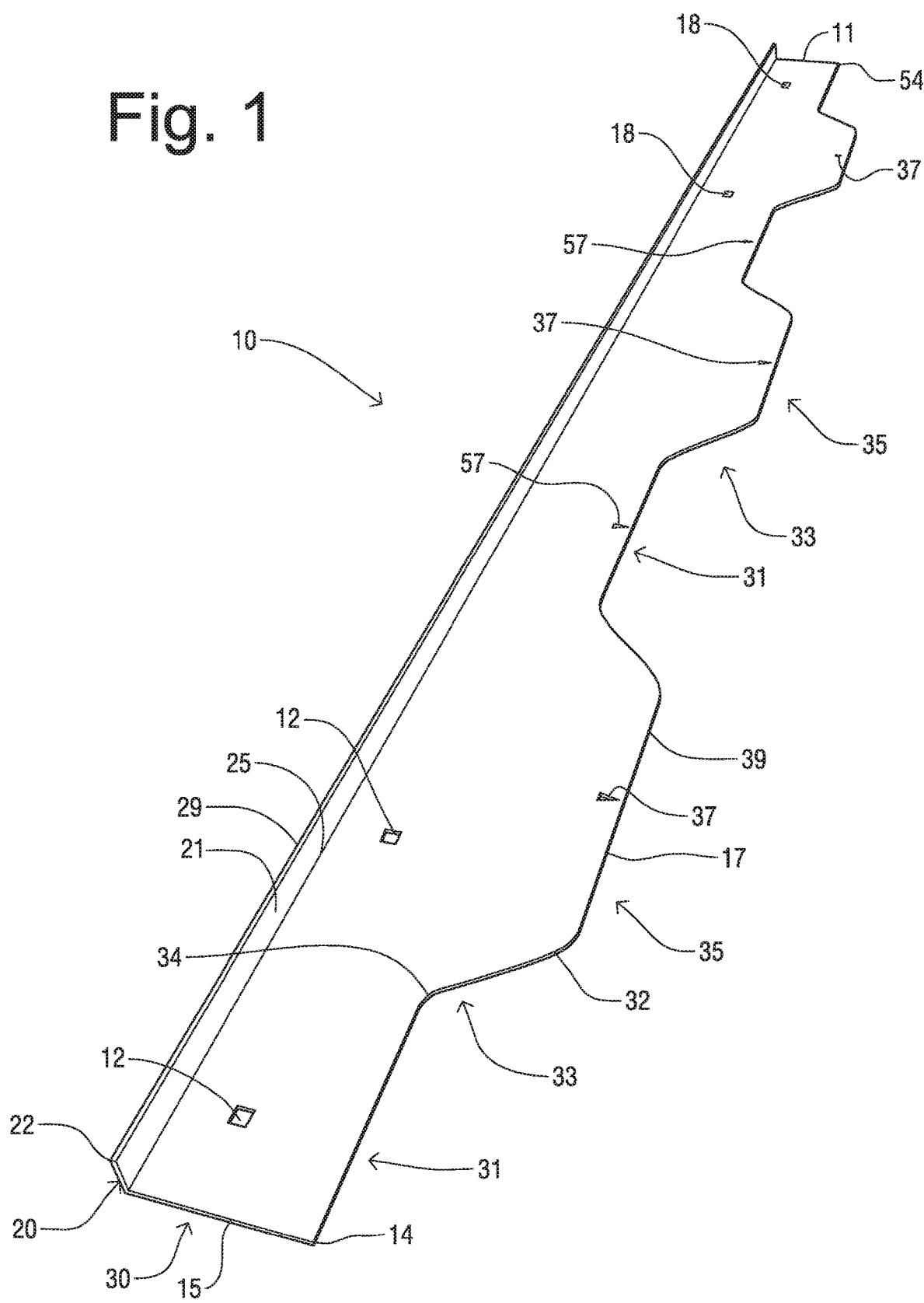
FIG. 1 is a perspective view of a single or primary template of a first embodiment of the present invention illustrating a first variation in the curvature pattern of the cutting edge.

Referring now to FIG. 1, a single or primary template 10 of the synthetic turf seam integration template system is illustrated in accordance with a preferred embodiment of the present invention. As shown, the template 10 comprises a planar base 30 with a perpendicularly-extending positioner 20.

Figure 2:
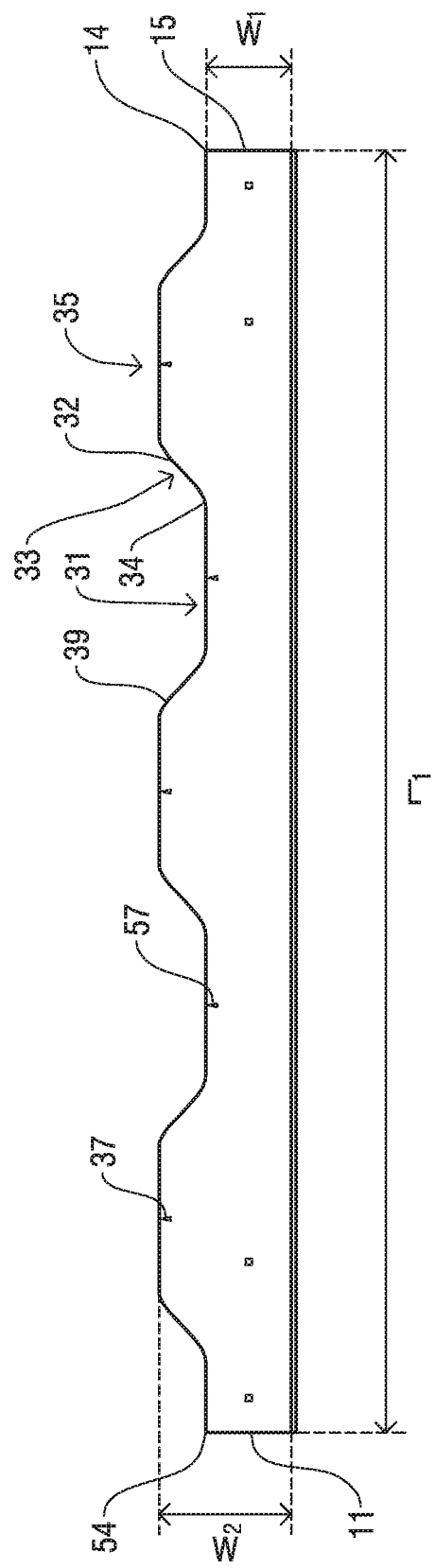
FIG. 2 is a top view of the single or primary template of FIG. 1 with dimension lines.

The planar base 30 extends longitudinally from a first lateral base end 15 (the left end on FIG. 1) to an opposing second lateral base end 11. The planar base 30 has a longitudinal cutting edge 39 with a predetermined primary curvature pattern and an opposing longitudinal non-cutting edge 25. The cutting edge 39 extends between outer corners 14, 54 (FIG. 2). The planar base 30 is formed of a flat sheet or plate of relatively thin material having sufficient robustness to be used as a cutting pattern or template for drawing a line to be cut and having sufficient durability to be used in an outdoor environment.

As seen in the first embodiment of FIG. 1, a flange (projecting upward in FIG. 1 and when the tool is in use) extends vertically from the non-cutting edge 25 of horizontally-extending base 30. This vertically-extending straight flange serves as a positioner 20. The positioner 20 extends at least half the length of the longitudinal non-cutting edge 25 and preferably extends from over three-fourths of the length of the non-cutting edge 25 up to the length of the non-cutting edge 25. The positioner 20 may be attached to or formed unitarily with the base 30. The positioner 20 is used as a handle, handgrip, or holder that provides a convenient gripping projection that enables the user to easily situate the template 10 in the correct location or nudge the template 10 slightly for alignment purposes both at the first location of cutting when beginning the cutting process and when moving the template 10 to any second and following locations along the inner turf edge as it is cut. Positioner 20 includes upright portion 21 that ends in upright edge 29. The corners 22 formed at the outer ends of the upright edge 29 may be formed as generally a right angle, as shown in FIG. 1, or may be somewhat rounded for safety.

Figure 6:
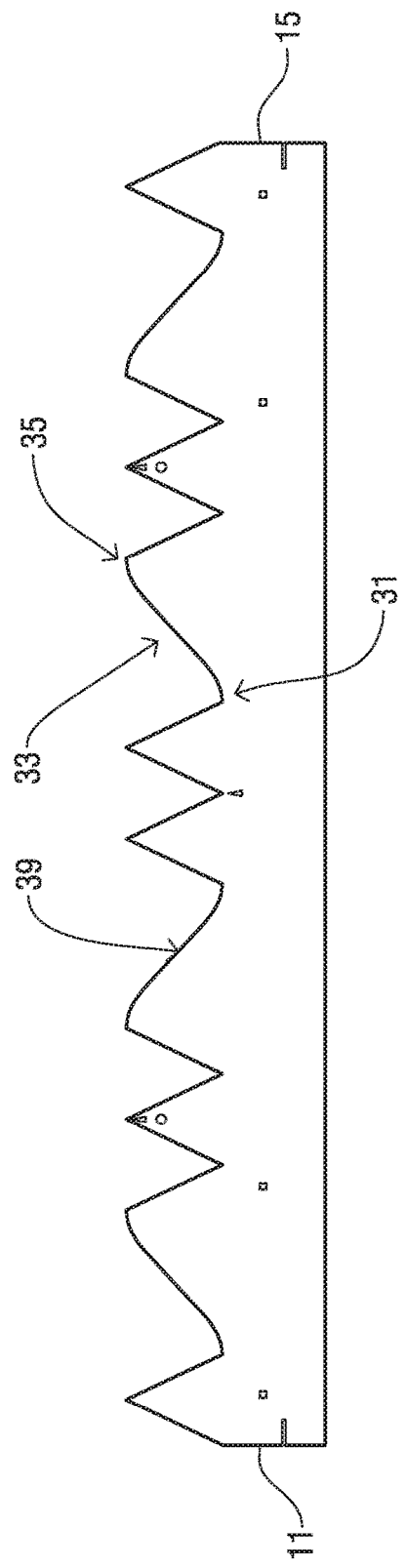
FIG. 6 is a top view of a single or primary template showing a further exemplary variation of the predetermined curvature pattern of the cutting edge.

The longitudinal cutting edge 39 is does not form a straight longitudinal edge, but instead is configured with any of a variety of predetermined curvature patterns. Several variations of the curvature pattern are illustrated, but other curvature patterns are within the scope of the invention. For example, FIGS. 1-2 and 7 illustrate an isosceles trapezoidal curvature, FIG. 5 illustrates a wave curvature pattern, and FIG. 6 illustrates an irregular curvature pattern. Other possible curvature patterns include a triangle pattern, a parallelogram pattern, a non-isosceles trapezoidal pattern, and the like. The trapezoidal curvature pattern provides the advantage of a reduction in waste compared to the wave curvature pattern; this is due to the decreased width W3 (FIG. 2) that is needed for the trapezoidal pattern compared to the wave pattern of FIG. 5. The trapezoidal curvature pattern also provides an increased efficiency of use compared to the irregular curvature pattern of FIG. 6. All of the predetermined curvature patterns are created by multiple laterally narrow portions 31 (between the straight non-cutting edge 25 of planar base 30 and the longitudinal cutting edge 39) interposed between or interspersed with multiple laterally wide portions 35 (between the straight non-cutting edge 25 of planar base 30 and the longitudinal cutting edge 39) with the exterior edges of the narrow and wide portions 31, 35 forming the curvature pattern. However, in some applications, the wave curvature pattern is preferred to give the least visible seam/

As an example, if a short solitary pattern-repeat template 10 is desired, it may be formed with one of the narrow portions 31 at the first lateral base end 15, with another narrow portion 31 at the opposing second lateral base end 11, and with one wide portion 35 disposed between the first and second narrow portions 31 at either lateral base end 11, 15. However, preferably, the template 10 additionally includes additional interspersed wide 35 and narrow 31 portions, such as the double pattern-repeat template 10 of FIG. 5 or the triple pattern-repeat template 10 of FIG. 1. A shorter template 10 provides the advantage of weight reduction and ease of positioning, but a longer template 10 provides efficiency and increased speed of cutting, because less moving and repositioning is required.

Between each narrow portion 31 and the adjacent wide portion 35 is an intermediary or interlinking portion 33. Together, the exterior edges of the narrow portion 31, wide portion 35, and interlinking portion 33 form the cutting edge 39. The exterior edges of the narrow portion 31, wide portion 35 and interlinking portion 33 may be generally straight with corners 32, 34 connecting the portions, as in FIGS. 1-2, or may be generally curved with less defined points of juncture, as in the wave pattern of FIG. 5, or may vary between one set of wide 35 and narrow 31 portions and the adjacent set of wide 35 and narrow 31 portions, as in FIG. 6.

Preferably, the template 10 includes wide offset arrows 37 centered in the middle of the wide portions 35 and narrow offset arrows 57 centered in the middle of the narrow portions 31. The offset arrows 37, 57 are disposed in the middle of the center portion (widest in this example) and offset portion (narrowest in this example) of the predetermined curvature sections to allow easy visual alignment by the template system user. The offset arrows 37, 57 may be printed, inscribed or embossed upon the template 10, may be stickers adhesively applied to the template 10, may be through-cuts formed into or cut out of the template 10, or otherwise applied to the template 10 in the appropriate location to allow the user to align an arrow 37, 57 to an outer edge of the turf when the inner edge of the turf is to be cut or to aid in alignment offset.

Preferably, the planar base 30 and positioner 20 are formed of metal for most applications, but may optionally be formed of plastic. Any of various metal materials may be used, such as galvanized steel, stainless steel, aluminum or the like. Preferably the metal material chosen is corrosion resistant and lightweight, yet robust and durable. Optionally, the metal may be powder-coated for durability. The usage of aluminum material provides advantageous characteristics, such as having a lighter weight than steel and having a high strength-to-weight ratio while being durable and rustproof. The usage of plastic to form the template 10 also provides advantages, such as being lightweight, rustproof, and economical. Additionally, a template 10 formed of plastic can be rolled and placed into a bucket or cylinder, which facilitates storage and transport before the sale of the tool and between uses.

To form the template 10, a plate or sheet of metal can be cut in a shape that includes both the base 30 (with a predetermined curvature) and the positioner 20. Laser cutting or the like may be used to make this outline cut. Then the cut metal shape can be bent so that the positioner 20 forms a substantially 90-degree angle with the non-cutting edge 25 of the base 30. The bend may be made by means known in the metal fabricating art, such as using cold forming, hot forming, or annealing means. If the template 10 is to be formed of plastic, it may be formed by any plastic molding technique as is known or becomes known in the art, such as injection molding, compression molding, blow molding, thermoforming, or the like, and, therefore, bending may not be necessary.

If two identical ("duplicate") templates 10 are to be used with the optional connector 40, the planar base 30 of each the first and second duplicate templates is further configured with left side connector-attaching holes 12 and right side connector-attaching holes 18 to allow the connector 40 to be manually attached to the right side of the first duplicate template and to the left side of the second duplicate template. Thereby, in effect, a template of double the length of a single template is created. In larger areas of turf installation, the usage of the connector 40 may prove more efficient and save time, as less movement and relocation of the template 10 is required.

Figure 3:
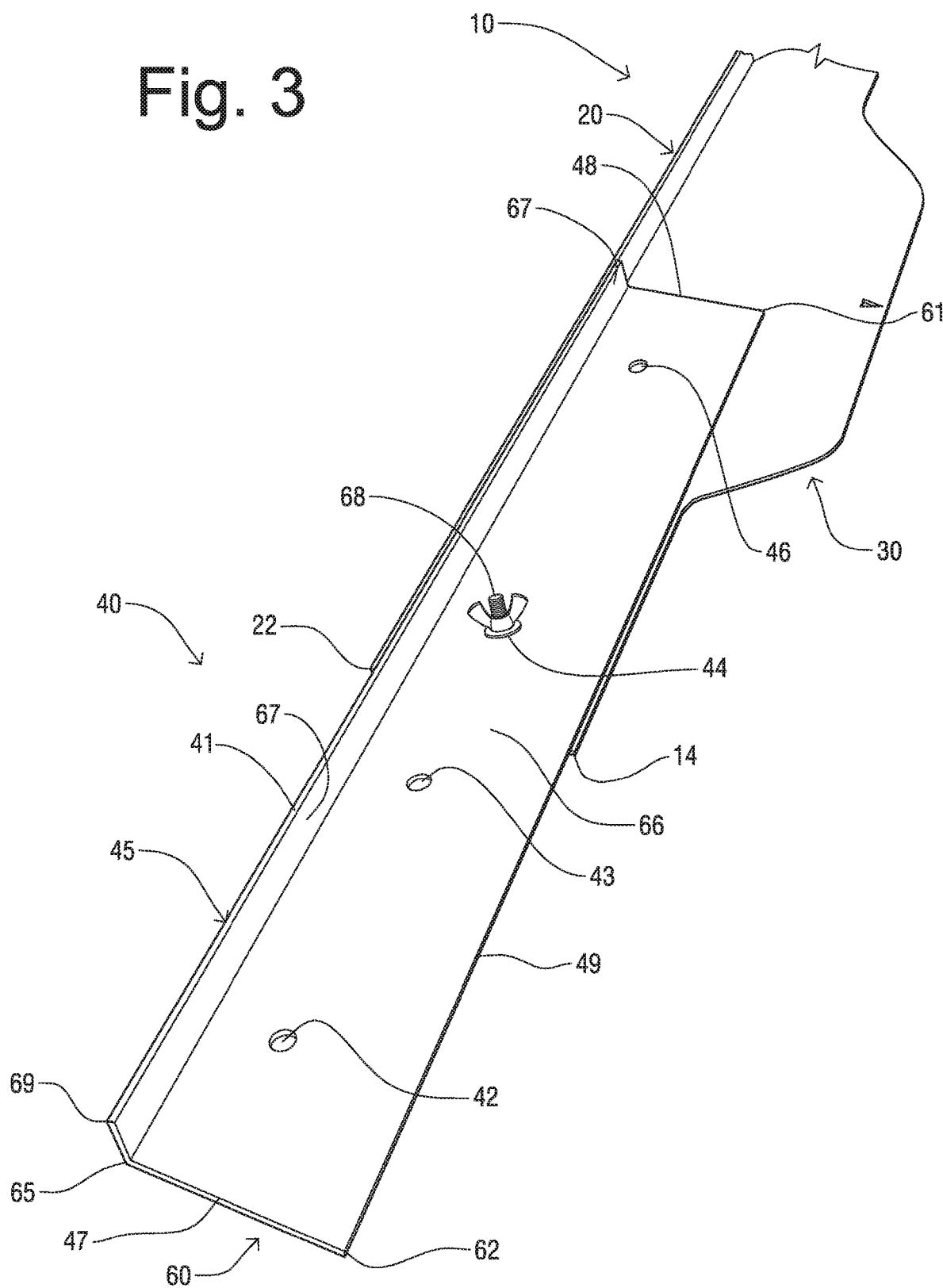
FIG. 3 is a perspective view of an optional connector of one aspect of the template system of the present invention, which is used to connect two duplicate primary templates together to provide the functionality of a longer template for more efficiency when longer seams are being cut.

The optional connector 40 is illustrated in FIGS. 3-4. The connector 40 may be used with two duplicate templates 10 in non-coordinating mode. When using the coordinating template set with two primary templates 10 and two coordinating templates 110, two connectors 40 will be required. The first connector 40 will connect the two duplicate templates 10 to create a longer template set for cutting the first turf piece. The second connector 40 will be required to connect two of the coordinating templates 110 to create a longer second template set to cut the opposing second turf piece.

The connector 40 includes at least a horizontal member 60 and, optionally, includes a connector flange 45 that is perpendicularly attached to, or integrally formed with, the horizontal member 60.

The horizontal member 60 extends longitudinally from a first lateral end 47 to an opposing second lateral end 48. The horizontal member 60 has an outer longitudinal edge 49 that extends from outer corner 61 to outer corner 62 and has an opposing inner longitudinal edge 65. Outer longitudinal edge 49 is illustrated as straight, but the shape is not important to the invention because it does not extend past cutting edge 39, so may optionally be curved or shaped in another manner. Inner longitudinal edge 65 is straight to allow it to allow it to be manually abutted against the non-cutting edge 25 or to be manually abutted against the inner corner formed by the template planar base 30 with the positioner 20 to assist in alignment of the connector holes 42, 43, 44, 46 when the template 10 includes positioner 20. The horizontal member 60 is formed of a flat sheet or plate of relatively thin material having sufficient robustness to be used to form a longitudinal connection between a first primary template 10 and a second primary template 10 (or between a first coordinating template 110 and a second coordinating template 110), thereby lengthening the cutting edge 39 by combining the cutting edge 39 of the first template 10 with the cutting edge 39 of the second template 10 (or by lengthening the cutting edge 139 by combining the cutting edges 139 of both a first coordinating template 110 and a second coordinating template 110).

The connector horizontal member 60 is configured with one or more connector left lateral holes 42, 43 disposed on the left half of connector 40 and one or more connector right lateral holes 44, 46 disposed on the right half of connector 40. The left lateral holes 42, 43 are spaced to align with the right side connector-attaching holes 18 of the planar base 30 of a first template. The right lateral holes 44, 46 are spaced to align with the left side connector-attaching holes 12 of the planar base 30 of a second template. Joining mechanisms 68, such as bolts, are inserted into the aligned holes to join the connector 40 to each of the two templates 10 to releasably create the template-connector-template combination. Similarly, the connector 40 may also be used with two coordinating templates 110.

The optional vertical flange 45, if provided, projects upwardly from the inner edge 65 of horizontal member 60 forming a corner with the inner longitudinal edge 65. This forms a generally L-shaped connector 40. The vertical flange 45 may extend partially or fully along the length of the connector inner longitudinal edge 65. The flange 45 is shown as extending the full length of the connector inner longitudinal edge 65. The flange 45 has an upright portion 67 ending in upper edge 41 with upright corners 67, 69, which may be right angle corners or rounded. The upright portion 67 of flange 45 is preferably a similar height or the same height as the upright portion 21 of positioner 20. The flange 45 serves to assist in moving or nudging the connector 40 into the position where it can be removably joined to planar base 30 of template 10 by aligning the left lateral holes 42, 43 with the right side connector-attaching holes 18 of a first template and in aligning the right lateral holes 44, 46 with the left side connector-attaching holes 12 of a second template.

Preferably, the connector 40 and the optional flange 45 are formed of metal, although plastic material may also be used.

Any of the metals and fabrication techniques mentioned above in the formation of the template 10 may be used in the fabrication of the connector 40 and the optional flange 45.

FIG. 7 illustrates the two types of templates, the first or primary template 10 of the first embodiment and a coordinating template 110 that may be used with the primary template 10. The primary template, as in the first embodiment, has a cutting edge 39 configured in accordance to the predetermined primary curvature pattern. The coordinating template 110 is similar to the primary template 10, except that the cutting edge 139 is configured with a coordinating or complementary curvature pattern. The complementary curvature pattern is offset so that (1.) the middle of the widest part 35 of the primary curvature pattern matches the middle of the narrowest part 131 of the complementary curvature pattern and (2.) the middle of the narrowest part 31 of the primary curvature pattern matches the middle of the widest part 135 of the complementary curvature pattern. Thus, when a primary template 10 is used to cut the inner edge 73 of a first turf piece and the coordinating template 110 is used to cut the inner edge 83 of a second turf piece, the curvature patterns align. Notably, there is no need for the user to manually offset either template. For convenience of the user, the two types of templates may be labeled, such as the "A" 16 and "B" 116 labeling shown in FIG. 7.

FIGS. 13 and 14 illustrate a third embodiment, which shares many elements and features with the first two embodiments, but in which the template 10 lacks the positioner 20 and in which the template 10 is configured with a view slot 50 defined by view slot edges 51.

As in the first two embodiments, the planar base 30 extends longitudinally from a first lateral base end 15 to an opposing second lateral base end 11. The planar base 30 has a longitudinal cutting edge 39 with a predetermined primary curvature pattern and an opposing longitudinal non-cutting edge 25. The planar base 30 is formed of a flat sheet or plate of relatively thin material. The material may be, for example, metal or a durable plastic. When made out of some types of plastic, the template 10 may be curled longitudinally upon itself to form a spiral configuration. This spiral configuration of the template 10 may conveniently be stored and/or carried to a job site in a bucket. The template 10 of the third embodiment without the positioner 20 will more readily curl into the spiral configuration.

The third embodiment also illustrates a view slot 50, which allows a user to see a user-created or manufacturer-created visible guideline 77, 87 disposed on the back side of the turf. This aids in alignment of the template 10. The view slot 50 is a longitudinally-extending through-hole defined by view slot edges 51. The view slot 50 is longer than it is wide. Preferably the view slot 50 has a length from 10% to 40% of the length of a single curve pattern (where the single curve pattern length is the length between two adjacent arrows 37 or two adjacent arrows 57. The view slot 50 is offset a predetermined distance from the longitudinal non-cutting edge 25.

The view slot 50 is a through-hole extending through the thickness of the base 30 from front to back. It may be formed by cutting or otherwise removing a portion of the material forming the template (for example, removing a portion of an aluminum template) or may be originally formed with these through-holes, such as by plastic molding. The base left holes 12 and the base right holes 18 are also through-holes that may be formed similarly. In one aspect of the invention, the wide offset arrows 37 centered in the middle of the wide portions 35 and the narrow offset arrows 57 centered in the middle of the narrow portions 31 are also through-holes formed similarly.

Though the template 10 of the third embodiment shares many similarities to the first two embodiments, the lack of a perpendicular positioner 20 eliminates the possibility of using the positioner 20 as a type of handle. Instead, the template 10 of the third embodiment may be moved by curling the fingers under an edge and grasping the edge to move or reposition the template 10.

Methods of use of the synthetic turf seam integration template system of the present invention are shown in FIGS. 8-12. The method of using the primary template 10 of the first embodiment to cut the inner (adjacent) edges 73, 83 of both a first and a second turf piece is shown in FIGS. 8-11. The method of using a primary template 10 of the first embodiment along with the coordinating template 110 of the second embodiment is shown in FIG. 12. In one aspect, the cutting edge 39 used directly for cutting along with a cutting device. In another aspect, the cutting edge 39 is used to define and mark the pattern to be cut by first tracing a mark along the cutting edge 39, and then the tool user cuts along the tracing mark.

When starting the use of the synthetic turf seam integration template system of the present invention, as shown in the diagram of FIG. 8, the two pieces of turf (turf piece 70 and turf piece 80) to be joined by a seam are positioned with the inner edges 73, 83 near each other. (FIG. 8 is a diagram for illustration, and in use the longitudinal length of the two pieces of turf would at times be several to many times the length L1 of the template 10 and the lateral width might be significantly wider than shown.) The inner edges 73, 83 of both the left turf piece 70 and the right turf piece 80 are turned back. The grass face of the turned back portion of left turf piece 70 is overlapped onto the grass face of the flat, non-turned back portion of the left turf piece 70. Therefore, this overlapped turf 75 has the turf backing or understructure facing upward and the grass face facing downward. On the right side, similarly, the overlapped turf 85 has the turf backing or understructure facing upward and the grass face facing downward overlapped onto the grass face of the flat, non-turned back portion of the right turf piece 80.

FIG. 9 shows a visible guideline 77, 87, which may be user-created line or manufacturer-created line. The user-created line may be a chalk line or other marker line that is created by the user on the understructure of each turf overlap 75, 85. The manufacturer-created line may be inadvertently or intentionally produced during fabrication. For instance, parallel lines may be inadvertently created via the attachment of grass tufts when fibers are punched, tufted, or seamed through a sheet of backing fabric (which is typically then covered with urethane to help hold the fibers in place). In another aspect, parallel lines of perforations that facilitate drainage may be used as guidelines. Or the manufacture-created lines may be purpose-made for alignment purposes, such as parallel lines printed or stamped onto the back surface of the understructure.

Any user-created or manufacturer-created guideline 77, 87 that can be visually distinguished can be used, but, commonly, a chalk line will need to be snapped onto the turf understructure.

In an exemplary method of a user-created visible guideline 77, 87, the user may measure a distance D1 from the inner edge 73, 83 of each turf piece 70, 80, and then snap a chalk line at the distance D1. The distance D1 is slightly wider than the width (W1 of FIG. 2 or W3 of FIG. 5) of the template 10 to allow room for placing the template 10 on the line and cutting the edge of the turf that extends beyond the template 10. The distance D1 may be, for example, in the range of 5 to 10 inches, but is preferably 6 to 8 inches. However, the distance D1 should be only slightly larger (such as 1 to 6 inches larger) than the width of the template 10 to avoid excessive waste of the synthetic turf material.

In an exemplary method of a manufacture-created visible guideline 77, 87, the visible guideline 77, 87 is a line that is inherent in the turf understructure that is visible due to inadvertent results of the fabrication techniques or purpose-made by the manufacturer. So, if one of these In an exemplary method of a user-created visible guideline 77, 87 is disposed at approximately the distance D1, it may be merely located and used.

In one aspect, as seen on the left half of FIG. 10, after creating or locating a visible guideline 77, 87 the tool user then positions the lateral end 15 of template 10 on the starting edge 72 of the turf 75 and aligns the non-cutting edge 25 along the visible line 77. A carpet knife, utility knife or similar turf-cutting tool is used to cut 71 near the inner edge 73 of the turf overlap 75 along the cutting edge 39 in the predetermined curvature pattern. The cut is made only through the turf understructure of the overlap 70. The predetermined curvature illustrated in FIG. 10 is the wave curvature, but the cutting of other curvature patterns proceeds through the same steps.

If the inner edge 73 of the turf piece 70 that is to be cut is longer than the template 10 (which is not the case in the left side of FIG. 10, but is the case on the right side of the figure), the template 10 is manually picked up and repositioned using the positioner 20 (when using the template of the first two embodiments) or using the edge 25, 39 (when using the template of the third embodiment (with the non-cutting edge 25 positioned along guideline 77 and with the lateral end 15 of the template positioned at the end of the previous cut. Another cut is then made along the cutting edge 39. The template 10 may be moved, repositioned, and utilized as a cutting edge multiple times until the ending edge of the turf piece is reached. After completion of all of the cuts required to reach the ending edge 58 of the turf piece, the turf wastage 79 that has been cut from the main portion of the first turf piece 70 is removed.

After the first turf piece 79 is cut, the user will begin the steps necessary to cut the second turf piece 80. These steps are shown on the right half of FIG. 10. The tool user removes the template 10 from the first turf piece 70, rotates it 180 degrees so the non-cutting edge 25 is toward the fold of the turf piece 80 and the cutting edge 39 is toward the turf center edge 83, and repositions it onto the second turf piece 80. The repositioned template 10 is shown in this second position on the right side of FIG. 10. To reposition the template 10, the offset arrow 37 in the middle of the widest portion of the curvature is positioned at the starting edge 82 of the turf 85. This is in contrast to the positioning of the template lateral end 15 (which is the middle of the narrowest portion of curvature of the template 10) on the starting edge 72 of the overlap 75 for the cut of the first turf piece 70. The placement of the offset arrow 37 at the starting edge 82 of the second turf piece 80 will cause this second side cut to form the counterpart to the cut just performed on the first turf piece 70. This positioning is done so that the middle of the narrowest part of the predetermined curve pattern of the first cut will meet the middle of the widest part of the predetermined curve pattern of the second cut. This allows the two cut pieces to abut smoothly when folded back with the grass face upward.

Again, as in the first cut, the non-cutting edge 25 of the template 10 is aligned along the visible line 87. The turf-cutting tool is used to cut 81 the inner edge 83 of the turf overlap 85 in the predetermined curvature using cutting edge 39. As with the first cut of turf piece 70, if the turf piece 80 is longer than the template 10, the template 10 will need to be raised and repositioned to accommodate the longer cut. The user may be required to move the template 10 one or multiple times, depending on the length of the inner edge 83 of the turf piece 80 to be cut. After the one or more cuts of overlap 85 are made, the second turf wastage piece 89 is removed.

In the aspect in which the cutting edge 39 is used to define the curve to be cut by creation of a tracing mark that will be cut along, the steps are similar to the above steps, but instead of cutting along the cutting edge 39, the tool user uses a marker or other marking device to trace along the cutting edge 39. If the width of the turf piece 70, 80 being marked for cutting is wider than the template 10, the template is raised, moved, and repositioned as described above to allow the user to mark along the template 10 until reaching the ending edge 58 of the turf piece 70, 80 being marked for cutting. After completing the tracing mark on the turf piece 70, 80 being marked for cutting, the tool user removes the template 10 from the overlap and cuts along the tracing mark.

FIG. 11 illustrates the two turf pieces 70, 80 after both turf pieces 70, 80 have been cut and both wastage pieces 79, 89 have been removed. The freshly cut edges 74, 84 are ready to be positioned together to form the seam, which will be inconspicuous due to the cutting of the turf pieces in correlating curves based on the predetermined curvature pattern used.

Next the two overlaps 75, 85 are flipped back flat with the turf understructure downward and with the turf grass face upward. The cut edges 74, 84 are adjusted and pulled to abut at the center seam that will be created. The widest part of the first (left) cut inner edge 74 aligns with the narrowest part of the second (right) cut inner edge 84, and vice versa. Then, preferably, as per the standard technique, seam cloth or tape is placed under the seam with an adhesive on the upward side. Both cut inner edges are manually placed onto the adhesive of the seam tape and pressed downward.

FIG. 12 illustrates the usage of the two non-identical but complementary templates, the primary template 10 of the first embodiment that is used with the coordinating template 110 of the second embodiment. Utilizing the coordinating template 110 removes the need for the user to remember to offset the first template 10 to cut the second turf piece 80. This is because the curvature pattern of the coordinating template 110 is offset the proper amount. Therefore, the user merely uses the primary template 10 to cut the first side (the first turf piece 70) and uses the coordinating template 110 on the second side (second turf piece 80). Both templates 10, 110 are aligned by the user at the starting edges 72, 83, thus simplifying the usage of the template system of the present invention.

The first cut of turf piece 70 is illustrated on the left side of FIG. 12. The turning back of the inner edges 73, 83 of the first and second turf pieces 70, 80 (shown in FIG. 8) and the location or creation of a visible orientation line 77, 87 (shown in FIG. 9) has already occurred prior to the steps described in relation to FIG. 12.

As shown on the left side of FIG. 12, the lateral end 15 of the primary template 10 is placed at the starting edge 72 of the overlap 75 just as in the first embodiment. The same steps as described above in relation to the primary template 10 are then followed with the cut following the curvature pattern and resulting in a wastage piece 79 that is removed.

The cut of the second turf piece 80 is done using the second type of template, the coordinating template 110. When using this coordinating template 110, the lateral template end 111 is placed on the starting edge 82 of the second turf piece 80. Consequently, when using the coordinating template 110, both the primary template 10 and the coordinating template 110 have their outermost lateral edges 15, 111 placed on the starting edges 72, 82 of the turf pieces 70, 80. There is no need for the user to remember to use the offset arrows 37, 57 to offset any template. After placement of the lateral template end 111 onto the starting edge 82, the cutting steps and seaming steps proceed as described above.

When a longer template would be desirable due to the size of the turf installation, the user may choose to use the connector 40 to create a template-connector-template combination, which doubles the length of a single template by joining a first primary template 10 to a second primary template 10. The connector left lateral holes 42, 43 are aligned with the right side connector-attaching holes 18 of the planar base 30 of the primary template. A joining mechanism 68 is used to connect the right portion of the template planar base 30 to the left portion of the connector 40. Then the right lateral holes 44, 46 are aligned with the left side connector-attaching holes 12 of the planar base 30 and joined by the joining mechanism.

In a similar manner, two duplicate coordinating templates 110 may be joined by connector 40, if needed.

Though the template system has been described as utilized for cutting synthetic turf to create an undetectable seam, the template system may also be used for cutting other similar materials to create an undetectable seam, such as carpet pieces, fabric pieces (such as might be adhered to a structure or otherwise need an undetectable seam), or the like.

The sizes and materials used for the template system may be dictated by the material to be cut and user preferences as to weight, length, and durability. Exemplary measurements are given for the template system that is to be used to cut synthetic turf. The length L1 (FIG. 2) of the template 10 from the first lateral end 15 to the second lateral end 11 may be over 4 feet, is preferably in the range of 6 to 10 feet, and is most preferably 7 to 9 feet. The distance from a first offset arrow 37 at a first widest part of the template 10 to a second offset arrow 37 at a second widest part of the template 10 is over 6 inches but is preferably in the range of 15 to 30 inches and is most preferably 23 to 27 inches. The distance between the offset arrows 31 that indicate the narrowest part of the template would necessarily be equal to the distance between the offset arrows 37 of the widest part. As depicted in the figures, with the template 10 ending at the middle of a narrow portion 31 of the curvature pattern, the distance from the outermost (leftmost or rightmost) offset arrow 37 to the outermost (leftmost or rightmost) edge of a lateral end 11, 15 will necessarily be half the distance between adjacent offset arrows 37. If the template 10 ends with the widest part 35 of the curvature pattern at a lateral end 11, 15, the distance from the outermost offset arrow 57 to the outermost edge of a lateral end 11, 15 will necessarily be half the distance between adjacent offset arrows 57.

As seen in FIG. 2, when the template 10, 110 has an isosceles trapezoidal curvature, the width W2 between the non-cutting edge 25 and the widest part of the template 10 may be in the range of 3.5 to 15 inches, but is preferably in the range of 6 to 10 inches and most preferably 6.5 to 7.5 inches. And the width W1 between the non-cutting edge 25 and the narrow portion of the planar base 30 may be in the range of 2 to 8 inches, but is preferably in the range of 3 to 5 inches and most preferably 4 to 4.5 inches.

When the template 10, 110 has other curvature patterns besides the isosceles trapezoidal curvature pattern, the measurements may differ. For example, the width W3 (FIG. 5) between the non-cutting edge 25 and the widest part of the planar base 30 may be larger when a curved or wavy pattern is used. The width W3 on the curved pattern may be in the range of 3.5 to 20 inches, but is preferably in the range of 7 to 12 inches and most preferably 9 to 10 inches. The width W4 (FIG. 5) between the non-cutting edge 25 and the narrow portion of the planar base 30 is similar to the width W1 of FIG. 2.

When the template 10, 110 is formed of aluminum, the thickness of the aluminum may be in the range of 0.08 to 0.3 inch, but is preferably between 0.12 and 0.14 inches.

The invention illustratively disclosed herein suitably may be practiced in the absence of any element which is not specifically disclosed herein.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A tool system for cutting synthetic turf, comprising:
    a first template comprising a first-template planar base extending longitudinally a base longitudinal length between two opposing lateral base ends and extending laterally a base lateral width between two opposing edges; wherein one of said two opposing edges comprises a longitudinally-extending cutting edge having a primary predetermined curvature pattern; wherein said longitudinally-extending cutting edge is configured to be used as a pattern for manually cutting said synthetic turf in said primary predetermined curvature pattern; wherein said base longitudinal length is at least three times said base lateral width; wherein said first-template planar base comprises a straight, through-cut long narrow viewing slot running longitudinally and disposed between said two opposing edges.

2. The tool system for cutting synthetic turf, as recited in claim 1 further comprising:
    a second template comprising a second-template planar base extending longitudinally a base longitudinal length between two opposing lateral base ends and extending laterally a base lateral width between two opposing edges; wherein one of said two opposing edges comprises a longitudinally-extending cutting edge having a primary predetermined curvature pattern; wherein said longitudinally-extending cutting edge is configured to be used as a pattern for manually cutting said synthetic turf in said primary predetermined curvature pattern; wherein said base longitudinal length is at least three times said base lateral width; wherein said second-template planar base comprises a straight, through-cut long narrow viewing slot running longitudinally and disposed between said two opposing edges; and
    a connector configured to connect said first template to said second template.

3. The tool system for cutting synthetic turf, as recited in claim 2, wherein said connector comprises a connector horizontal member extending laterally between a first longitudinal edge and an opposing second longitudinal edge and extending longitudinally between a right lateral end and an opposing left lateral end; wherein said connector horizontal member comprises a middle, a right half extending inwardly from said right lateral end to said middle, and comprises a left half extending inwardly from said left lateral end to said middle; wherein said connector right half is configured with at least one right lateral hole defined by right lateral hole edges; and wherein said connector left half is configured with at least one left lateral hole defined by left lateral hole edges.

4. The tool system for cutting synthetic turf, as recited in claim 1 wherein said first-template planar base extends longitudinally a distance of at least 4 feet and said first-template planar base extends laterally a distance of at least 6 inches.

5. The tool system for cutting synthetic turf, as recited in claim 1 wherein:
   said first-template planar base further comprises through-cut base left holes disposed on the left half of said first-template planar base and through-cut base right holes disposed on the right half of said first-template planar base; and
   wherein said second-template planar base further comprises through-cut base left holes disposed on the left half of said second-template planar base and base right holes disposed on the right half of said second-template planar base.

6. The tool system for cutting synthetic turf, as recited in claim 1 wherein said first-template planar base further comprises a through-cut arrow designating a center portion of said predetermined curvature pattern and a through-cut arrow designating an offset portion of said predetermined curvature pattern.

7. The tool system for cutting synthetic turf, as recited in claim 1, wherein said primary predetermined curvature pattern is a wave pattern.

8. The tool system for cutting synthetic turf, as recited in claim 1, wherein said primary predetermined curvature pattern is a trapezoidal pattern.

9. The tool system for cutting synthetic turf, as recited in claim 1, wherein said first template is formed of a plastic material.

10. A method for creating a synthetic turf seam, comprising:
    identifying a first turf piece comprising a first visible guideline and a first inner edge to be cut; wherein said first turf piece comprises a first grass face and an opposing first turf understructure;
    identifying a second turf piece comprising a second visible guideline and a second inner edge to be cut; wherein said second turf piece comprises a second grass face and an opposing second turf understructure;
    creating a first turf overlap by turning back said first inner edge of said first turf piece; wherein said turning back results in at least a portion of said first turf understructure of said first turf overlap facing upward and in at least a portion of said first grass face of said first turf overlap laying adjacent to said first grass face of an un-turned portion of said first turf piece;
    creating a second turf overlap by turning back said second inner edge of said second turf piece; wherein said turning back results in at least a portion of said second turf understructure of said second turf overlap facing upward and in at least a portion of said second grass face of said second turf overlap laying adjacent to said second grass face of an un-turned portion of said second turf piece;
    obtaining a first template comprising a first-template planar base comprising a first-template longitudinally-extending cutting edge with a predetermined curvature pattern and further comprising a through-cut, straight, long narrow view slot running longitudinally;
    aligning said view slot of said first template with said first visible guideline of said first turf piece;
    manually cutting said first turf piece along said first-template longitudinally-extending cutting edge in said predetermined curvature pattern to create a freshly cut first inner turf edge and to produce first turf wastage;
    aligning said view slot of said first template with said second visible guideline of said second turf piece;
    manually cutting said second turf piece along said first-template longitudinally-extending cutting edge in said predetermined curvature pattern to create a freshly cut second inner turf edge and to produce second turf wastage; and
    fitting said freshly cut first inner turf edge against said freshly cut second inner turf edge to create said synthetic turf seam.

11. The method for creating a synthetic turf seam, as recited in claim 10, further comprising:
    placing seam tape under said freshly cut first inner turf edge and said freshly cut second inner turf edge; and
    adhesively attaching said freshly cut first inner turf edge and said freshly cut second inner turf edge to said seam tape.

12. The method for creating a synthetic turf seam, as recited in claim 10, wherein said first template extends longitudinally between first-template opposing lateral ends; said method further comprising:
    obtaining a second template comprising a second-template planar base having a second-template longitudinally-extending cutting edge having said predetermined curvature pattern; wherein said second template extends longitudinally between second-template opposing lateral ends;
    positioning said second template with said one of said second-template opposing lateral ends adjacent to one of said first-template opposing lateral ends;
    manually joining said first template to said second template by use of at least one connector; and
    manually cutting along said cutting edge of said first-template longitudinally-extending cutting edge and along said cutting edge of said second longitudinally-extending cutting edge to create a freshly cut combination inner turf edge and to produce combination turf wastage.

13. The method for creating a synthetic turf seam, as recited in claim 10, further comprising:
    removing said first turf overlap by reversing said turning back of said first turf piece;
    removing said second turf overlap by reversing said turning back of said second turf piece;
    placing seam tape under said freshly cut first inner turf edge and said a freshly cut second inner turf edge; and
    adhesively attaching said freshly cut first inner turf edge and said a freshly cut second inner turf edge to said seam tape.

14. The method for creating a synthetic turf seam, as recited in claim 10 further comprising:
    obtaining said first turf piece; and
    obtaining said second turf piece.

15. The method for creating a synthetic turf seam, as recited in claim 10 further comprising:
obtaining a turf-cutting tool; wherein:
manually cutting said first turf piece along said first-template longitudinally-extending cutting edge comprises using said turf-cutting tool to cut along said first-template longitudinally-extending cutting edge in said predetermined curvature pattern; and
manually cutting said second turf piece along said first-template longitudinally-extending cutting edge comprises using said turf-cutting tool to cut along said first-template longitudinally-extending cutting edge in said predetermined curvature pattern.

16. The method for creating a synthetic turf seam, as recited in claim 10 further comprising:
unfolding said first turf overlap; and
unfolding said second turf overlap.

17. The method for creating a synthetic turf seam, as recited in claim 10 further comprising:
unfolding said first turf overlap to position said first turf understructure of said first turf piece downward and said first turf grass of said first turf piece upward;
unfolding said second turf overlap to position said second turf understructure of said second turf piece downward and said second turf grass of said second turf piece upward;
removing said first turf wastage; and
removing said second turf wastage.

18. A method for creating a synthetic turf seam, comprising:
identifying a first turf piece having an edge to be cut; wherein said first turf piece comprises a first grass face, and an opposing first turf understructure;
identifying a second turf piece having an edge to be cut; wherein said second turf piece comprises a second grass face and an opposing second turf understructure;
creating a first turf overlap by turning back a first inner edge of said first turf piece; wherein said turning back results in at least a portion of said first turf understructure of said first turf overlap facing upward and in at least a portion of said first grass face of said first turf overlap laying adjacent to said first grass face of an un-turned portion of said first turf piece;
creating a second turf overlap by turning back a second inner edge of said second turf piece; wherein said turning back results in at least a portion of said second turf understructure of said second turf overlap facing upward and in at least a portion of said second grass face of said second turf overlap laying adjacent to said second grass face of an un-turned portion of said second turf piece;
obtaining a template comprising a planar base comprising a longitudinally-extending cutting edge with a predetermined curvature pattern;
positioning said template on said first turf understructure of said first turf piece;
manually applying, by marking along said predetermined curvature pattern, a first tracing mark onto said first turf understructure;
cutting along said first tracing mark to create a freshly cut first inner turf edge and to produce first turf wastage;
positioning said template on said second turf understructure of said second turf piece;
manually applying, by marking along said predetermined curvature pattern, a second tracing mark onto said second turf understructure;
cutting along said second tracing mark to create a freshly cut second inner turf edge and to produce second turf wastage;
fitting said freshly cut first inner turf edge against said freshly cut second inner turf edge;
removing said first turf wastage; and
removing said second turf wastage.

19. The method for creating a synthetic turf seam, as recited in claim 18, wherein said template extends longitudinally between opposing lateral ends; said method further comprising:
obtaining a duplicate template comprising a duplicate-template planar base having a duplicate-template longitudinally-extending cutting edge having said predetermined curvature pattern and having first and second duplicate lateral ends;
wherein said duplicate template extends longitudinally between said first and second duplicate lateral ends;
positioning said duplicate template with said one of said first and second duplicate lateral ends adjacent to one of said opposing lateral ends;
manually joining said template to said duplicate template by use of at least one connector to create an extended combination longitudinally-extending cutting edge;
manually applying, by marking along said predetermined curvature pattern of said extended combination longitudinally-extending cutting edge, an extended tracing mark onto said first turf understructure;
manually cutting along said extended tracing mark to create a freshly cut combination inner turf edge and to produce combination turf wastage; and
removing said combination turf wastage.

20. The method for creating a synthetic turf seam, as recited in claim 18, wherein said template further comprises a view slot; and wherein said first turf piece comprises a first visible guide; the method further comprising:
aligning said view slot with said first visible guide of said first turf piece.

* * * * *